(12) United States Patent
Sakamoto

(10) Patent No.: US 11,725,155 B2
(45) Date of Patent: Aug. 15, 2023

(54) ORGANIC MATERIAL GASIFICATION SYSTEM, AND CARBONIZATION FURNACE AND GASIFICATION FURNACE USED THEREFOR

(71) Applicant: STREET DESIGN CORPORATION, Kanagawa (JP)

(72) Inventor: Kajiro Sakamoto, Kanagawa (JP)

(73) Assignee: STREET DESIGN CORPORATION, Kanagawa (JP)

( * ) Notice: Subject to any disclaimer, the term of this patent is extended or adjusted under 35 U.S.C. 154(b) by 0 days.

(21) Appl. No.: 17/712,034

(22) Filed: Apr. 1, 2022

(65) Prior Publication Data

US 2022/0220398 A1 Jul. 14, 2022

Related U.S. Application Data

(63) Continuation of application No. PCT/JP2020/036611, filed on Sep. 28, 2020.

(30) Foreign Application Priority Data

Oct. 3, 2019 (JP) .................................. 2019-183273

(51) Int. Cl.
  *C10J 3/62* (2006.01)
  *C10B 21/18* (2006.01)
  (Continued)

(52) U.S. Cl.
  CPC ................. *C10J 3/62* (2013.01); *C10B 21/18* (2013.01); *C10B 49/06* (2013.01); *F23G 5/0276* (2013.01);
  (Continued)

(58) Field of Classification Search
  CPC .................. C10J 3/62; C10J 2300/0916; C10J 2300/0946; C10J 2300/1207;
  (Continued)

(56) References Cited

U.S. PATENT DOCUMENTS 1,684,875 A * 9/1928 Malbay ................... C10B 53/02
  202/124
2,572,051 A * 10/1951 Parry ...................... C10B 51/00
  201/34

(Continued)

FOREIGN PATENT DOCUMENTS

CN 112080294 A * 12/2020 ............. C10B 53/00
JP 200280854 A 3/2002
(Continued)

OTHER PUBLICATIONS

Machine Translation of CN-112080294-A (Mar. 17, 2023) (Year: 2023).*

(Continued)

*Primary Examiner* — Matthew J Merkling
(74) *Attorney, Agent, or Firm* — Hauptman Ham, LLP

(57) ABSTRACT

An organic material gasification system is configured such that a carbonization furnace provided with a first air supply mechanism that radiates high-temperature combustion air and high-temperature steam to an organic material combustion region and with a second air supply mechanism that supplies combustion air to an exhaust gas combustion region, to discharge high-temperature exhaust gas is connected to a gasification furnace including a heating unit penetrating through a reactor. A carbide from the carbonization furnace is supplied to the reactor, and the high-temperature exhaust gas from the carbonization furnace is supplied to the heating unit, so that the carbonization efficiency and the carbonization quality are improved and the gasification efficiency is improved.

20 Claims, 8 Drawing Sheets

(51) Int. Cl.
*C10B 49/06* (2006.01)
*F23G 5/027* (2006.01)

(52) U.S. Cl.
CPC ............... *C10J 2300/0916* (2013.01); *C10J 2300/0946* (2013.01); *C10J 2300/1207* (2013.01); *C10J 2300/1625* (2013.01); *C10J 2300/1861* (2013.01); *F23G 2209/26* (2013.01); *F23G 2209/28* (2013.01)

(58) Field of Classification Search
CPC ....... C10J 2300/1625; C10J 2300/1861; C10B 21/18; C10B 49/06; F23G 5/0276; F23G 2209/26; F23G 2209/28
See application file for complete search history.

(56) References Cited

U.S. PATENT DOCUMENTS

| | | | | |
|---|---|---|---|---|
| 2,680,065 A | * | 6/1954 | Atwell | C10J 3/10 48/202 |
| 2,732,332 A | * | 1/1956 | Geller | C10B 55/00 202/124 |
| 4,823,712 A | * | 4/1989 | Wormer | F23G 5/04 110/263 |
| 5,536,488 A | * | 7/1996 | Mansour | C10K 1/004 423/652 |
| 2001/0011457 A1 | | 8/2001 | Shishido et al. | |
| 2015/0151153 A1 | | 6/2015 | Sakamoto | |
| 2017/0348741 A1 | | 12/2017 | Iijima et al. | |

FOREIGN PATENT DOCUMENTS

| | | |
|---|---|---|
| JP | 2002309263 A | 10/2002 |
| JP | 2005112927 A | 4/2005 |
| JP | 200813736 A | 1/2008 |
| JP | 2013185093 A | 9/2013 |
| JP | 2016121257 A | 7/2016 |
| JP | 2017132676 A | 8/2017 |
| JP | 201989065 A | 6/2019 |
| WO | 2016104371 A1 | 6/2016 |

OTHER PUBLICATIONS

International Search Report in PCT Application No. PCT/JP2020/036611, dated Dec. 8, 2020, 11pp.

* cited by examiner

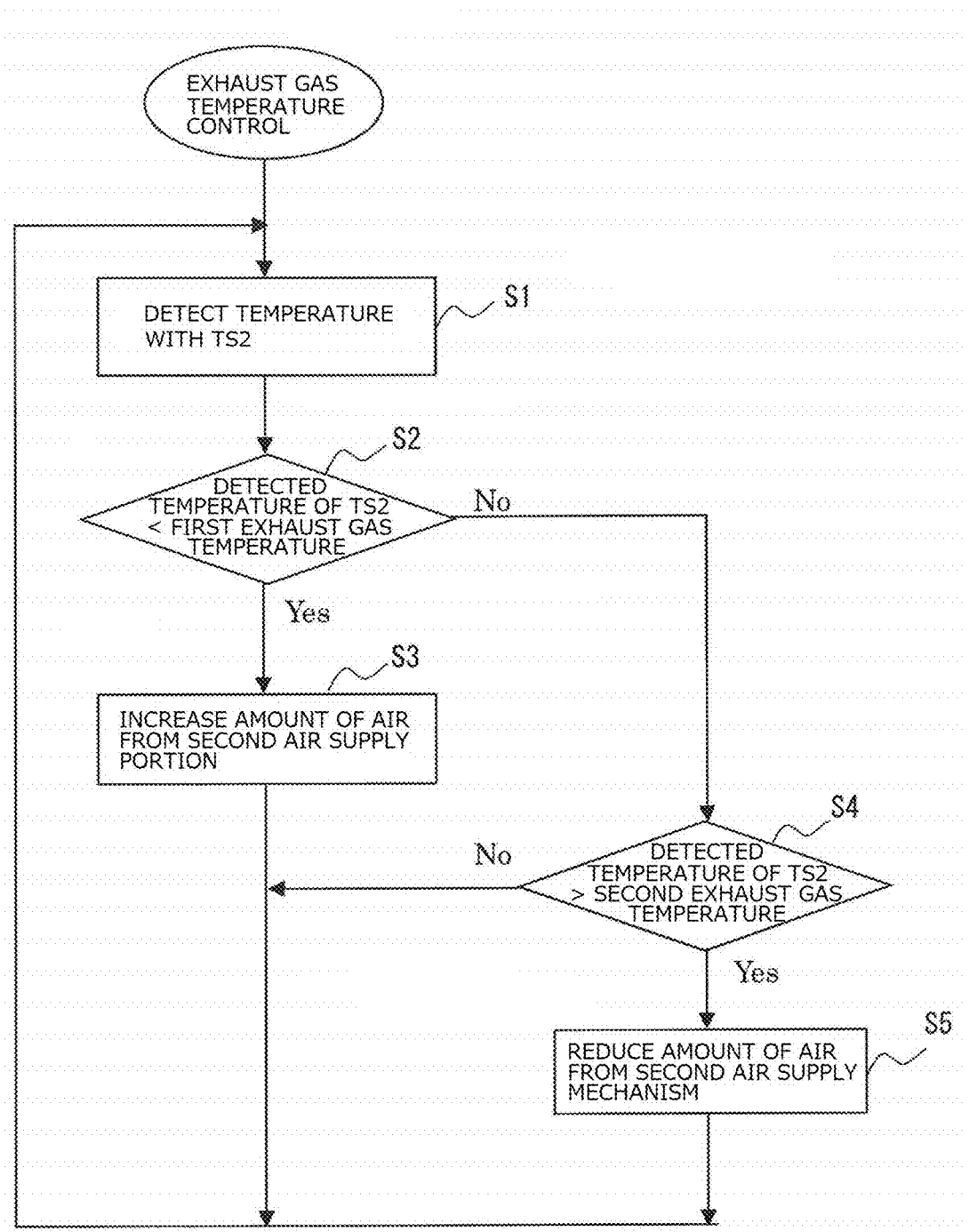

ORGANIC MATERIAL GASIFICATION SYSTEM, AND CARBONIZATION FURNACE AND GASIFICATION FURNACE USED THEREFOR

RELATED APPLICATIONS

The present application is a continuation of International Application No. PCT/JP2020/036611, filed Sep. 28, 2020, which claims priority from Japanese Patent Application No. 2019-183273, filed Oct. 3, 2019, the disclosures of which applications are hereby incorporated by reference here in their entirety.

TECHNICAL FIELD

The present invention relates to a carbonization furnace that carbonizes an organic material such as biomass or plastic (particularly, organic waste) to generate a carbide, to a gasification furnace that efficiently generates hydrogen and other various gases from the carbide, and to an organic material gasification system that gasifies the organic material such as biomass using the carbonization furnace and the gasification furnace, to generate electricity or energy such as hydrogen gas or ethanol.

BACKGROUND ART

In order to protect the natural environment and maintain the limited nature, the reuse of useful resources such as organic waste from animals, plants, and the like in the natural world and organic waste from a raw material such as petroleum has been underway in various fields. For example, a system that carbonizes biomass to extract various gases from a carbide of the biomass, a biomass power generation system that generates electricity using water gas extracted in such a manner, or the like is one example of the reuse. In addition, organic waste such as plastic, chemical fibers, or films generated from crude oil is also a cause of various environmental pollutions, and a system capable of effectively using organic waste such as plastic is also desired.

An organic material such as biomass or plastic can be gasified and converted into a useful substance such as hydrogen gas or ethanol that can be used as energy. In addition, gasified generated gas can be effectively used as fuel to generate electricity. Therefore, a system that extracts a useful substance from such organic waste and converts the substance into gas, electric energy, or the like effectively uses organic waste that has been treated as waste in the related art, and significantly contributes to the construction of a recycling society. As such a system, a biomass carbonization system (Patent Document 1) that generates water gas by carbonizing an organic material and generates electricity using the water gas, a biomass power generation system (Patent Document 2), or the like has been proposed.

CITATION LIST

Patent Document

Patent Document 1: WO 2016/104371 A
Patent Document 2: JP 2017-132676 A

SUMMARY OF THE INVENTION

Problem to be Solved by the Invention

In the techniques disclosed in Patent Documents 1 and 2, a carbonization furnace and a gasification furnace are separated from each other, an organic material such as wood (biomass) is carbonized by the carbonization furnace, and the gasification furnace generates water gas from a carbide generated in the carbonization furnace.

A heat storage tank having a cylindrical shape is provided inside the carbonization furnace, and the biomass that is a raw material is input from an upper portion of the carbonization furnace. In order to raise temperature inside the carbonization furnace to high temperature, a part of the biomass input to a combustion region is combusted. A region below the combustion region is a carbonization region, and is maintained in a state where the temperature is high and oxygen is deficient (hereinafter, referred to as an "oxygen deficient state") without oxygen supplied. The remaining biomass is carbonized in the carbonization region.

In the carbonization furnace for biomass disclosed in Patent Documents 1 and 2, the temperature inside the carbonization furnace is maintained at high temperature by combusting a part of the input biomass, and a carbide is generated from the biomass by exposing the biomass to a state where the temperature is a high temperature of approximately 800° C. and oxygen is deficient. For this reason, it is desirable that the amount of the biomass to be consumed as fuel is reduced to improve the ratio of the generated carbide to the input organic material (hereinafter, referred to as a carbonization efficiency), the quality of the carbide is improved, and the carbonization speed is raised.

In addition, the gasification furnace that generates useful gases such as water gas from the carbide requires high heat energy for gasification reaction. For this reason, in order to promote the gasification reaction, heat energy needs to be efficiently supplied to a reactor inside the gasification furnace. Since a pyrolyzer (corresponding to a gasification furnace) for carbide disclosed in Patent Document 1 or 2 has a structure where high-temperature exhaust gas flows through a tubular pipeline that surrounds the entirety of a reaction pipe (reactor) from outside, to heat the reaction pipe thereinside from outside, heat energy of the high-temperature exhaust gas flowing through an outer portion of the tubular pipeline is not efficiently transferred to the reaction pipe thereinside, and the heat energy of the input high-temperature exhaust gas cannot be effectively used for gasification reaction.

An object of the invention is to provide a carbonization furnace that can improve the carbonization efficiency of input an organic material and discharge high-temperature exhaust gas, a gasification furnace that increases the efficiency of use of heat energy to improve a gasification efficiency, and an organic material gasification system that gasifies the organic material with high efficiency and low cost using the carbonization furnace and the gasification furnace, or uses generated gas to convert the organic material into energy.

Means for Solving Problem

In order to achieve the above object, according to a first aspect of the invention, there is provided an organic material gasification system including: a carbonization furnace to generate a carbide when an organic material is input to the carbonization furnace; and a gasification furnace including a reactor where the carbide generated by the carbonization furnace and a gasifying agent are input, and a heating unit to heat the reactor, to gasify the input carbide.

The carbonization furnace includes an organic material combustion region where a part of the organic material is combusted to maintain a temperature of the carbonization furnace at a high temperature, and a carbonization region where the organic material is carbonized, and high-temperature steam is radiated to the organic material in the organic material combustion region.

It is preferable that the high-temperature steam is superheated steam of 800° C. or higher, but the high-temperature steam is not limited thereto. Since the high-temperature steam is supplied, the organic material can be directly carbonized by the high-temperature steam, and the carbonization efficiency is improved.

In the organic material gasification system according to another aspect of the invention, the carbonization furnace further includes an exhaust gas combustion region where flammable gas generated in the organic material combustion region and in the carbonization region is combusted, and an exhaust gas discharge portion to discharge high-temperature exhaust gas generated by the combustion of the flammable gas, and the high-temperature exhaust gas discharged from an inside of the carbonization furnace is supplied to the heating unit of the gasification furnace.

In the organic material combustion region, flammable gas, such as combustion exhaust gas containing a tar component, or carbon monoxide, is generated by reaction in a short time caused by the combustion of the organic material and an improvement in thermal conductivity of high-temperature steam and of the organic material. The flammable gas is combusted in the exhaust gas combustion region, and the temperature of the flammable gas is raised to a higher temperature than a temperature of the organic material combustion region, so that the flammable gas and the tar component are combusted to generate high-temperature exhaust gas. The high-temperature exhaust gas is sent from the exhaust gas discharge portion to the heating unit of the gasification furnace.

According to a second aspect of the invention, there is provided a carbonization furnace to maintain a temperature of the carbonization furnace at a high temperature, and to carbonize an organic material to be input by combusting a part of the organic material in an organic material combustion region inside the carbonization furnace. A steam supply unit is provided to radiate high-temperature steam to the organic material in the organic material combustion region. The steam supply unit radiates the heated steam to the organic material combustion region to directly carbonize the carbide, so that the carbonization efficiency of the organic material can be increased, and the amount of the flammable gas can be increased.

In the carbonization furnace according to another aspect of the invention, the carbonization furnace includes a first air supply mechanism to supply combustion air to the organic material combustion region. The first air supply mechanism has a heating space formed by a first outer peripheral wall surrounding at least a part of the organic material combustion region of the carbonization furnace from an outside, a first frame body portion forming an inner wall of the carbonization furnace on an organic material combustion region side of the heating space includes at least one through-hole, and the combustion air is supplied to the heating space, and is supplied to the organic material combustion region via the through-hole. It is preferable that the first frame body portion has heat resistance and a thermal conductive property. It is preferable that the first frame body portion also has a heat storage property.

With this configuration, since the combustion air is heated in the heating space, and high-temperature combustion air can be supplied to the organic material combustion region, it is possible to prevent a decrease in the temperature of the organic material combustion region caused by the input of low-temperature combustion air.

In the carbonization furnace according to another aspect of the invention, the steam supply unit supplies the high-temperature steam to the heating space of the first air supply mechanism, and the high-temperature steam is radiated to the organic material combustion region via the through-hole. A configuration is preferable in which the steam supply unit is a tubular body having a good thermal conductive property and being installed in the heating space, steam supplied from an outside is superheated when passing through an inside of the tubular body, and superheated steam is radiated to the heating space from a tip of the tubular body.

Accordingly, the first air supply mechanism also has a function of the steam supply unit.

The carbonization furnace according to another aspect of the invention further includes a second air supply mechanism to combust flammable gas in an exhaust gas combustion region, the flammable gas being generated by combustion and carbonization of the organic material in the organic material combustion region and by radiation of the high-temperature steam to the organic material, and an exhaust gas discharge portion to discharge the flammable gas in the exhaust gas combustion region as high-temperature exhaust gas. The second air supply mechanism can be configured in the same manner as the first air supply mechanism relating to the supply of the combustion air.

The configuration can be such that the second air supply mechanism has a heating space formed by a second outer peripheral wall surrounding at least a part of the organic material combustion region of the carbonization furnace from an outside, a second frame body portion forming an inner wall of the carbonization furnace on an exhaust gas combustion region side of the heating space includes at least one through-hole, and combustion air is supplied to the heating space, and is supplied to the organic material combustion region via the through-hole.

With this structure, various flammable gases generated in the organic material combustion region is combusted in the exhaust gas combustion region, so that not only a tar component of the exhaust gas can be combusted and cracked, but also high-temperature exhaust gas can be discharged, and the high-temperature exhaust gas can be used as a more effective heat source such as heating steam to be radiated to the gasification furnace or to the organic material combustion region, to a high temperature.

Further, in the carbonization furnace according to another aspect of the invention, the steam supply unit includes a steam chamber provided above the exhaust gas combustion region to generate high-temperature steam, and a steam supply pipe unit routed from the steam chamber to the organic material combustion region via the exhaust gas combustion region to convey the high-temperature steam of the steam chamber while additionally heating the high-temperature steam, and to radiate the high-temperature steam to the organic material combustion region. Accordingly, higher temperature steam can be radiated toward the organic material combustion region. In addition, the configuration also can be such that a temperature sensor is provided in the vicinity of the exhaust gas combustion region, and when a temperature of the temperature sensor is a predetermined temperature or lower, the amount of the combustion air is increased, and a temperature of the exhaust gas combustion region is maintained at the predetermined temperature or higher.

According to a third aspect of the invention, there is provided a gasification furnace to gasify an input carbide, the gasification furnace including: a tubular main body portion including an internal space; a heating unit made of a material having a high thermal conductivity and/or a high heat storage property, penetrating through a central portion of the internal space of the tubular main body portion in a length direction, and including a flow path where high-temperature gas passes; a reaction unit formed by the internal space surrounding the heating unit, to be heated by the heating unit to gasify the input carbide; a raw material supply unit provided upstream of the reaction unit to input the carbide and a gasifying agent to the reaction unit; and a gas extraction port provided on a downstream side of the reaction unit to extract various useful gases generated by the reaction unit.

In this aspect, the heating unit is provided to penetrate through the center of or the vicinity of the center of the tubular main body portion serving as a reactor with a material having a high thermal conductive property and/or a high heat storage property, so that heat energy of the high-temperature gas can be more efficiently transmitted to the reactor, and the heating efficiency of the reactor can be improved.

In addition, the raw material supply unit is configured to include a carbide supply unit to supply a predetermined amount of the carbide obtained by finely pulverizing the carbide supplied from a carbonization furnace, with a pulverizing unit, and a spray input unit to mix the pulverized carbide and the gasifying agent, and to spray and input the pulverized carbide and the gasifying agent to the reaction unit, so that the gasification efficiency in the reactor can be improved. It is preferable that for example, superheated steam of 800° C. or higher is supplied as high-temperature steam serving as the gasifying agent. Further, it is desirable that a negative pressure is applied to the reaction unit of the gasification furnace from the raw material supply unit toward the gas extraction port.

Accordingly, the raw material can be moved inside the reactor from upstream to downstream to promote reaction, and generated useful gases can be extracted on the downstream side. In addition, the heating unit includes a plurality of projections and recesses to increase an area of contact with the reaction unit, in a surface of an outer wall or an inner wall of the heating unit, so that the efficiency of heat transfer to the reactor can be more improved.

An organic material gasification system to generate a useful gas from an organic material can be configured by combining any one of the carbonization furnaces according to the above aspects and any one of the gasification furnaces according to the above aspects. In addition, a biomass power generation system or an energy conversion system to generate ethanol or separates hydrogen gas can be constructed to use various useful gases generated by the organic material gasification system, as fuel.

Effect of the Invention

According to the organic material gasification system using the carbonization furnace and the gasification furnace of the invention, since it is possible to efficiently carbonize an organic material and it is possible to efficiently gasify a carbide, it is possible to provide an efficient and inexpensive organic material gasification system.

Particularly, according to the carbonization furnace of the invention, since high-temperature steam is radiated to the organic material combustion region, the carbonization rate can be significantly improved and the carbonization speed can be more raised as compared to simply when only a part of an organic material is combusted and carbonized. In addition, it is possible to input an organic material having a lower dryness level than in the related art. Further, since a configuration is provided in which flammable gas generated by combustion, carbonization, and the like is combusted in the exhaust gas combustion region, it is possible to provide high-temperature exhaust gas. In addition, it is possible to stably combust and crack a tar component of the exhaust gas.

In addition, according to the gasification furnace of the invention, since the heating unit penetrates through the center of the reactor, and high-temperature gas is supplied into the heating unit and passes therethrough, it is possible to provide a gasification furnace with a high thermal efficiency. Further, since a carbide is micronized and then input, and the gasifying agent is heated at high temperature and then is input, it is possible to more promote the efficiency of reaction.

Further, according to the organic material gasification system in which various carbonization furnaces and gasification furnaces according to the embodiments of the invention described above are combined, it is possible to provide an organic material "gasification system" in which effects of each carbonization furnace and each gasification furnace can be shared, and it is possible to provide a biomass energy conversion system.

As described above, in the gasification furnace according to the invention, it is possible to dramatically improve the heat exchange efficiency of high-temperature gas that is a heat source of the heating unit, and it is possible to reduce the size of the gasification furnace and achieve efficient gasification reaction. When the carbonization furnace and the gasification furnace are used which are efficient and can be reduced in size according to the invention as described above, since it is possible to significantly improve the carbonization efficiency and the gasification efficiency, and flexibly construct a facility in terms of size according to the generation amount of an organic material, it is possible to significantly improve the cost-effectiveness, the construction of a small-scale biomass power generation system that is practical for local production and local consumption can be more easily realized than in the related art.

BRIEF DESCRIPTION OF DRAWINGS

FIG. 8 is a flowchart illustrating one example of temperature control of exhaust gas of the carbonization furnace according to the invention.

MODES FOR CARRYING OUT THE INVENTION

Hereinafter, a carbonization furnace, a gasification furnace, an organic material gasification system, a method for carbonizing an organic material, and a method for gasifying an organic material according to the invention will be described with reference to the drawings. The organic material gasification system includes a carbonization furnace that generates a carbide from biomass, and a gasification furnace that generates various useful gases from the carbide. A biomass power generation system or a system that effectively uses other organic materials as energy can be constructed by supplying the useful gases generated by this system, to a generator, an ethanol generation device, hydrogen separator, etc.

Figure 1:
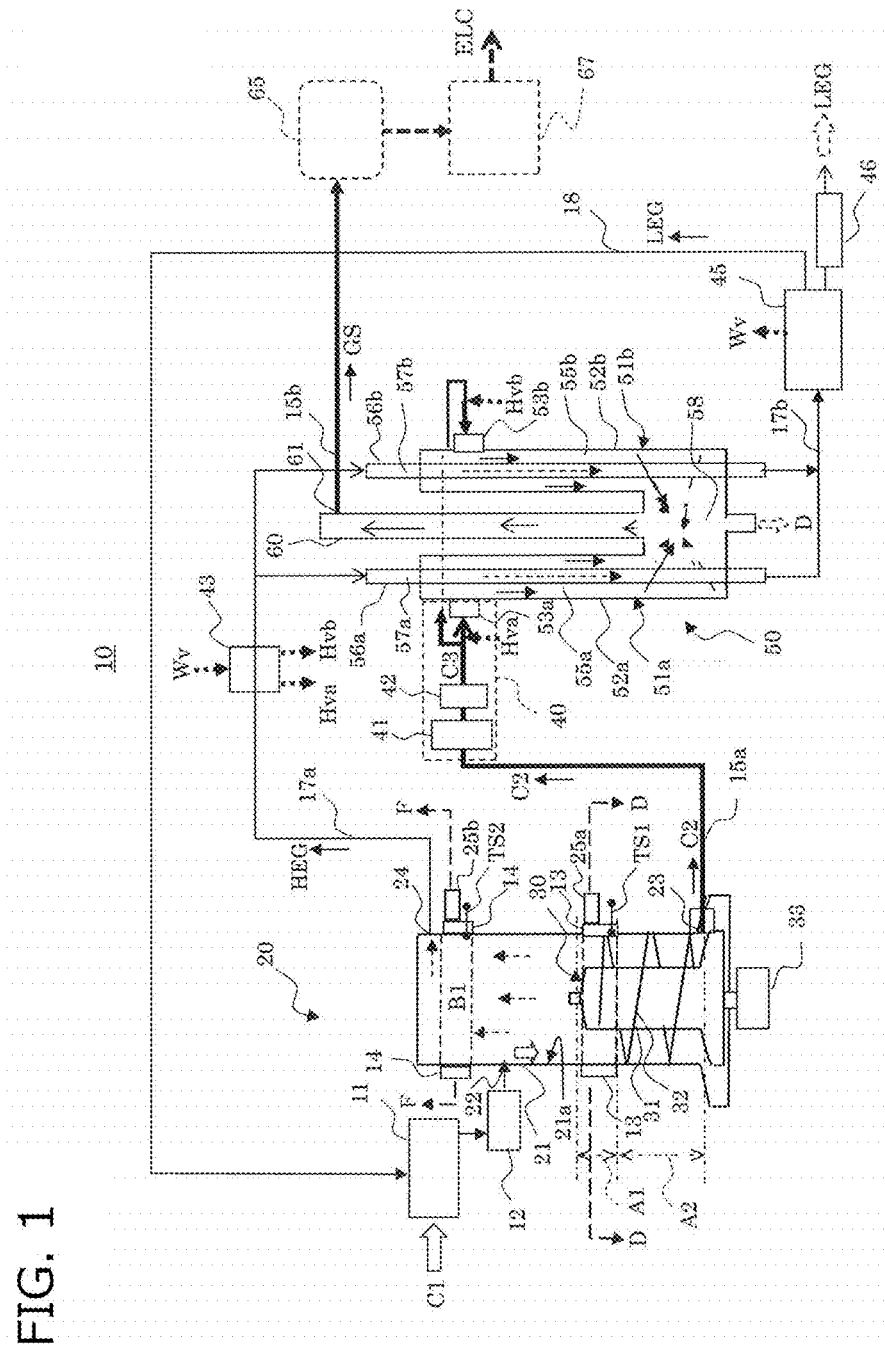
FIG. 1 is a view illustrating a schematic configuration of an organic material gasification system according to the invention.

FIG. 1 illustrates a functional block diagram illustrating a schematic configuration of an organic material gasification system according to one embodiment of the invention. An organic material gasification system 10 includes a carbonization furnace 20 that can efficiently generate a carbide from an organic material such as biomass by radiating high-temperature steam to an organic material combustion region where the organic material is combusted, and a gasification furnace 50 that is connected to the carbonization furnace and that can efficiently use heat energy of exhaust gas for gasification reaction by supplying high-temperature exhaust gas generated in the carbonization furnace, so as to pass through a heating unit provided to penetrate through a central portion of a reactor.

Incidentally, the organic material gasification system 10 illustrated in FIG. 1 that is configured to include the carbonization furnace 20 is provided as an example, but the organic material gasification system of the invention can also have a configuration where an organic material such as a carbide or plastic is directly supplied to the gasification furnace 50 without passing through the carbonization furnace 20. In that case, it is necessary to separately prepare a heat source of the gasification furnace.

As an example of using a generated gas GS output from the gasification furnace 50, FIG. 1 illustrates an example where a gas tank 65 that contains gas and a generator 67 are connected to each other (example where a biomass power generation system is configured as a whole) (block diagram is illustrated by broken lines). However, the organic material gasification system of the invention is not limited to such a power generation system. For example, the organic material gasification system can be used for various systems that generate various substances from organic waste, such as a system that generates a carbide from an organic material such as biomass and inputs gas generated by inputting the generated carbide to a gasification furnace, to an ethanol generation device to generate ethanol.

The carbonization furnace 20 according to one embodiment of the invention illustrated in FIG. 1 has a configuration where high-temperature steam is radiated to an organic material in an organic material combustion region A1. In addition, FIG. 1 illustrates an example of the carbonization furnace 20 including a heat storage body 30 that is rotatable and includes a screw-shaped protrusion portion 32 that can more accurately control the stay time of biomass in the organic material combustion region A1 and in a carbonization region A2 to more precisely control a carbonization process of the biomass in the carbonization furnace 20.

A raw material for a carbide to be input to the carbonization furnace 20 is not limited to biomass, and may be any organic material. Particularly, it is desirable that thinned wood or other wood, straw or rice husks discharged from rice farming, plants such as vegetables, household refuse such as vegetable waste or leftovers, and organic waste from a poultry farm or a ranch are effectively used as raw materials. In addition, the gasification furnace 50 of the invention can generate flammable gas by using plastic or other organic materials as a raw material. In this specification, a description will be given using an example where a carbide is generated from biomass of which the raw material is wood (woody biomass), but as described above, it is not intended that the raw material for the carbide is limited thereto. Since a biomass power generation system that uses waste wood such as thinned wood in a forest area is particularly expected to be shortly put to practical use as a small-sized power generation system serving as an electric energy source for local production and local consumption in a small-sized region adjacent to a forest, this example will be described.

Basic components such as a component that carbonizes an organic material to generate various gases from a carbide through gasification reaction, and a component that inputs the generated carbide to the gasification furnace to generate useful gases such as water gas are the same as system configurations disclosed in a biomass power generation system or the like of the related art. However, the organic material gasification system of the invention is characterized by each of the carbonization furnace and the gasification furnace that are components thereof, and it is possible to provide the organic material gasification system that is more efficient by using the carbonization furnace and the gasification furnace. Incidentally, in FIG. 1, only main components are simply illustrated to describe configurations of the carbonization furnace 20 and the gasification furnace 50 in an easy to understanding manner, and electric power supply lines for supplying electric energy, signal lines for acquiring information from various sensors, control signal lines for controlling various drive units, various drive mechanisms, control valves, filters, and the like are omitted.

As illustrated in FIG. 1, the organic material gasification system 10 according to a first embodiment of the invention includes the carbonization furnace 20 that includes a drying chamber 11 that dries an organic material C1 and an input device 12 that inputs the dried organic material C1 to the carbonization furnace 20, and the carbonization furnace 20 generating a carbide from the organic material C1; and the gasification furnace 50 that generates hydrogen gas and other gases (hereinafter, referred to as a "generated gas") from a carbide C2. When the organic material gasification system of the invention is used for the biomass power generation system, the generated gas GS generated by the organic material gasification system 10 is stored in the gas tank 65 that stores the generated gas (hydrogen gas or the like) generated by the gasification furnace 50, and is supplied to the generator 67 to generate electricity, and the electricity is supplied to a consumer as electric energy ELC.

The carbonization furnace 20 illustrated in FIG. 1 has a configuration where the organic material (woody biomass) that is a raw material is continuously input from an upper side of the carbonization furnace and the carbide is continuously extracted from a lower side of the carbonization furnace 20. The carbonization furnace 20 includes an outer frame body (main body portion) 21 made of a refractory material capable of withstanding high heat of one thousand and several hundred degrees or higher, and the heat storage body 30 that is rotatably provided inside the carbonization furnace. The outer frame body 21 is generally formed in a double structure formed of refractory bricks having high heat resistance that withstand a high temperature of one thousand and several hundred degrees, and a heat insulating material.

The organic material C1 such as woody biomass is cut into small pieces, and then is dried in the drying chamber 11. An organic material inlet 22 through which the dried organic material C1 is input is provided at an upper portion of the carbonization furnace 20. A proper amount of the dried organic material C1 is appropriately input to the carbonization furnace 20 from the organic material inlet 22 by the input device 12 (the input device 12 and the organic material inlet 22 form an "organic material input unit"). A carbide extraction portion 23 that extracts the carbide C2 from the carbonization furnace 20 and sends the carbide C2 to a next process is provided on a lower side of the carbonization furnace 20. In addition, a gas discharge portion 24 that combusts flammable gas generated by the combustion and carbonization of the organic material C1 and the input of high-temperature steam, and discharges the combusted gas as high-temperature exhaust gas HEG is provided at a higher position than the organic material inlet 22 of the carbonization furnace 20.

The heat storage body 30 is rotatably provided in an internal space of the carbonization furnace 20 at a lower position than the organic material inlet 22, and is rotationally driven by a motor 33 provided in a lower portion of the carbonization furnace 20. The protrusion portion 32 protruding toward an inner wall 21a of the outer frame body 21 is spirally (screw shape) provided on an outer peripheral portion (outer surface) 31 of the heat storage body 30. The heat storage body 30 is rotationally driven to slowly move the biomass and the carbide downward, which are accumulated between the inner wall 21a of the carbonization furnace 20 and the outer peripheral portion 31 of the heat storage body 30. The heat storage body 30 including the protrusion portion 32 is manufactured with a material having heat resistance and a heat storage property, and is controlled to rotate at a speed suitable for carbonizing the organic material C1, for example, a moderate speed of approximately one rotation every 20 minutes to 1 hour. The moving speed of the organic material C1 in a vertical direction inside the carbonization furnace 20 can be controlled by controlling the rotational speed of the heat storage body 30.

In addition, a part of a region at an upper portion of the heat storage body 30, and an internal space region interposed between the upper portion of the heat storage body 30 and the inner wall 21a of the outer frame body serves as the organic material combustion region A1. In order to maintain the carbonization furnace 20 at a high temperature of 800° C. or higher, a part of the organic material C1 is partially combusted in the organic material combustion region A1. Namely, the temperature of the organic material combustion region A1 inside the carbonization furnace 20 is maintained at a high temperature of 800° C. or higher by the partial combustion of the organic material C1. An internal space of the carbonization furnace 20 below the organic material combustion region A1 serves as the carbonization region A2.

Figure 2:
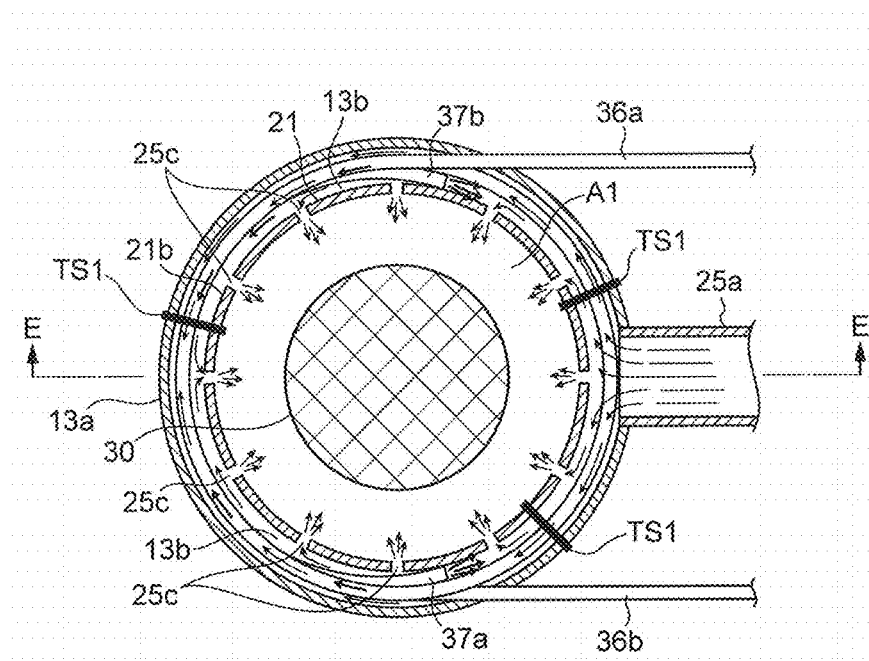
FIG. 2 is a horizontal sectional view of a first air supply mechanism portion schematically illustrating a cross section seen in a direction of line D-D attached to a carbonization furnace portion in FIG. 1.
Figure 3:
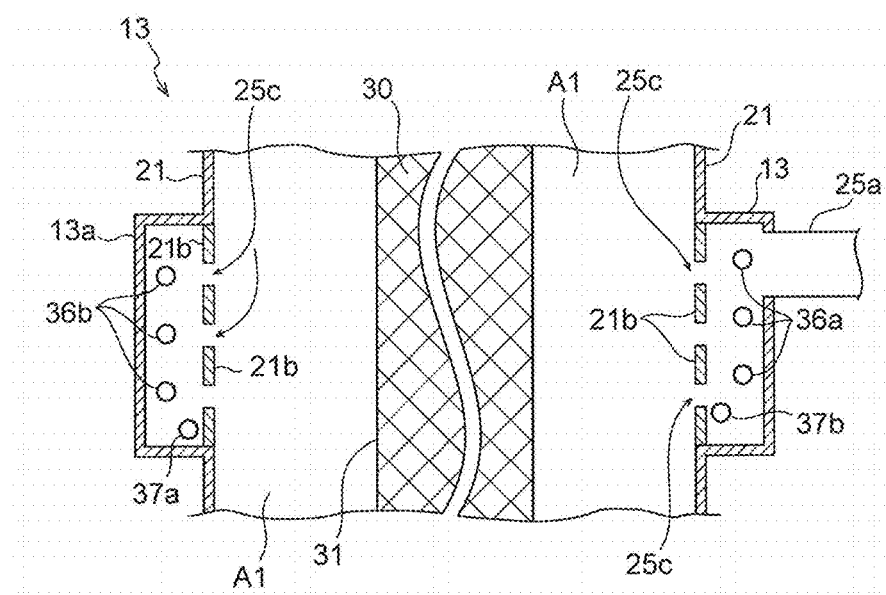
FIG. 3 is a vertical sectional view schematically illustrating a cross section of a first air supply mechanism seen in a direction of line E-E attached to FIG. 2.

A first air supply mechanism 13 that controls the combustion of the organic material C1 is provided at a portion of the outer frame body 21 corresponding to the position of the organic material combustion region A1 (first frame body portion 21b: refer to FIGS. 2 and 3). FIG. 2 illustrates a partial cross-sectional view of a center of the first air supply mechanism 13 taken along a horizontal direction (line D-D direction illustrated in FIG. 1), and FIG. 3 illustrates a cross-sectional view of a first air supply mechanism 13 portion taken along a direction of line E-E in FIG. 2. Incidentally, in FIGS. 2 and 3, the protrusion portion 32 of the heat storage body 30 and a configuration of a bottom portion of the carbonization furnace are omitted.

The first air supply mechanism 13 has a heating space 13b formed by surrounding an outer periphery of the first frame body portion 21b that is a portion of the outer frame body 21 corresponding to the position of the organic material combustion region A1, with a first outer peripheral wall 13a. Combustion air is supplied to the heating space 13b from a first air supply portion 25a. The first frame body portion 21b has one or a plurality of through-holes 25c penetrating therethrough to the organic material combustion region A1 inside the carbonization furnace. Incidentally, in FIGS. 2 and 3, a mode in which the first air supply mechanism 13 surrounds the entirety of the organic material combustion region A1 is provided as an example. It is preferable that the first air supply mechanism 13 covers the entirety of the organic material combustion region A1 in such a manner, but the first air supply mechanism 13 may be configured to partially surround only a part of the organic material combustion region A1. The same point is applied to the second air supply mechanism to be described below, and the second air supply mechanism does not necessarily cover the entirety of an exhaust gas combustion region B1.

The outer peripheral wall 13a of the first air supply mechanism 13 is made of a material having heat resistance and a heat-insulating property, and it is preferable that the first frame body portion 21b forming the inside of the heating space 13b is made of a material providing a good balance between a thermal conductive property and a heat storage property. Since the organic material combustion region A1 inside the carbonization furnace 20 is at a high temperature of 800° C. or higher, the heating space 13b also becomes very hot via the first frame body portion 21b, and the combustion air supplied into the heating space 13b is heated. The combustion air supplied from the first air supply portion 25a by a blower or the like is heated in the heating space 13b, and the high-temperature combustion air is supplied to the organic material combustion region A1 from the through-holes 25c. The supply amount of the combustion air (oxygen) is adjusted to control the combustion of the organic material C1 in the organic material combustion region A1. At this time, the combustion air is supplied at high temperature, so that a rapid decrease in the temperature of the organic material combustion region A1 inside the carbonization furnace caused by the combustion air can be suppressed, and stable combustion management and temperature management can be achieved.

Further, steam supply pipes 36a and 36b (corresponding to a steam supply unit) that supply steam are provided in the heating space 13b. Namely, high-temperature steam Wv is supplied into the heating space of the first air supply mechanism 13 through the steam supply pipes 36a and 36b. The steam supply pipes 36a and 36b are spirally wound inside the first air supply mechanism 13, and release the steam from steam discharge outlets 37a and 37b at tips of the steam supply pipes 36a and 36b. It is desirable that the high-temperature steam Wv heated to 160° C. or higher by a boiler 45 to be described later or by other heating device is supplied to the steam supply pipes 36a and 36b.

The steam supply pipes 36a and 36b that are wound inside the first air supply mechanism 13 are made of a material having a good thermal conductive property, and serve as heat exchange pipes, and the supplied steam is additionally heated in the heating space 13b of high temperature, and the steam inside the steam supply pipes 36a and 36b becomes higher temperature steam. The high-temperature steam released into the heating space 13b is supplied to the organic material combustion region A1 through the through-holes 25c, and is radiated to the organic material C1, together with the high-temperature combustion air. The steam to be supplied to the steam supply pipes 36a and 36b can also be heated using, for example, the high-temperature exhaust gas HEG or the like. Accordingly, higher temperature superheated steam can be generated in the heating space 13b. It is preferable that the first air supply mechanism 13 Is provided with a first temperature sensor TS1 that measures a temperature of the organic material combustion region A1.

When the amount of the combustion air supplied into the carbonization furnace 20 from the first air supply mechanism 13 is increased, the combustion amount of the organic material is increased, and the temperature of the organic material combustion region A1 rises. It is desirable that the temperature of the organic material combustion region A1 is maintained as high as possible, but when the amount of the combustion air is increased to raise the temperature, the amount of the organic material to be combusted is increased, so that the amount of the carbide to be generated from the input organic material is reduced, and the carbonization rate decreases. For this reason, in consideration of the carbonization rate and the like, it is preferable that the supply amount of the combustion air or the rotational speed of the heat storage body 30 is appropriately controlled to keep the temperature of the organic material combustion region A1 around 800° C. However, according to an operating purpose or an operating status of the system, the temperature of the organic material combustion region A1 may be controlled to maintain a higher temperature. The supply amount of the combustion air can be controlled by adjusting the air volume of the blower (not illustrated) or the like.

In addition, it is possible to obtain the following effect (high-temperature carbonization promotion effect): when the high-temperature steam is radiated to the organic material combustion region A1, the high-temperature superheated steam comes into direct contact with the organic material C1 that is not carbonized, so that the heat transfer efficiency by the high-temperature superheated steam rises dramatically, and the carbonization of the organic material C1 is promoted to significantly reduce the carbonization time and the carbonization efficiency. Due to the high-temperature carbonization promotion effect, the organic material C1 in the organic material combustion region A1 can be more efficiently carbonized, and the carbonization rate of the biomass can be improved by approximately 10% to 20% as compared to the related art.

In addition, in addition to flammable gas to be generated by the combustion of the biomass C1 in the related art, hydrogen gas ($H_2$), carbide (C), and oxygen (O) that are reaction gases of the superheated steam ($H_2O$) and the carbide react with each other to generate carbon monoxide gas (CO). The carbon monoxide gas (CO) and the hydrogen gas ($H_2$) contribute to the combustion of flammable exhaust gas in the exhaust gas combustion region B1 of the carbonization furnace 20 to be described later, and the temperature of the exhaust gas combustion region B1 can be raised to a higher temperature. Accordingly, not only it is possible to raise the temperature of the exhaust gas to a higher temperature, and supply a large amount of heat energy of the exhaust gas to the gasification furnace, but also it is possible to efficiently feed excessive heat energy back to the carbonization furnace such as being able to heat the steam to be input to the carbonization furnace, to a higher temperature in advance.

In addition, according to the technique of the related art, when the moisture content of the organic material C1 to be input to the carbonization furnace 20 is high, it takes time to combust or carbonize the organic material C1, so that the organic material C1 that is a raw material is dried until the moisture content becomes 10% or less, and then input to the carbonization furnace. On the other hand, the carbonization furnace of the invention has a configuration where the high-temperature steam is directly radiated to the organic material C1 in the organic material combustion region A1, so that combustion and carbonization can be promoted, and even when the moisture content of the organic material C1 is approximately 40% to 50%, the organic material C1 can be input to the carbonization furnace. Accordingly, the drying time can be shortened, the total carbonization speed of the organic material C1 can be improved, and heat energy for drying can be suppressed, so that a reduction in total cost can be achieved.

In the organic material combustion region A1, a part of the organic material C1 is combusted, and the remaining part is carbonized by the high-temperature steam. The organic material C1 that is not combusted or carbonized and the carbide C2 and combustion ash that are carbonized in the organic material combustion region A1 are conveyed from the organic material combustion region A1 to the carbonization region A2 below by the protrusion portion 32 having a screw shape as the heat storage body 30 rotates. The organic material C1 that is not combusted is carbonized by being exposed to a high-temperature environment and to an oxygen deficient environment by the heat storage body 30 under an oxygen deficient environment, and is extracted from the carbide extraction portion 23 as the carbide C2.

As described above, each of the carbonization rate, the carbonization speed, and the carbonization quality of the organic material can be improved by radiating the high-temperature steam to the organic material C1. Further, high-temperature exhaust gas can be discharged by combusting combustion gas generated by irradiation with the steam, in the exhaust gas combustion region B1, and a tar component of the exhaust gas can be more completely combusted by this combustion. Therefore, it is possible to provide the high-quality and low-cost carbonization furnace, and it is possible to provide the organic material gasification system that can gasify the organic material with high quality and low cost, due to an integrated effect with the efficient use of heat energy of the exhaust gas in the gasification furnace in a post-process described later.

When the organic material is combusted and carbonized in the organic material combustion region A1 and in the carbonization region A2, high-temperature flammable exhaust gas containing a tar component is generated. In addition, the high-temperature steam is radiated in the organic material combustion region A1, so that hydrogen gas ($H_2$), carbide (C), and oxygen (O) that are cracked gases of superheated steam ($H_2O$) react with each other to generate combustible carbon monoxide gas (CO). In the invention, the configuration is such that the flammable exhaust gas is combusted to raise the temperature of the exhaust gas to a higher temperature (high temperature of preferably higher than 1,000° C.), and then is supplied to the gasification furnace to reuse heat energy of the high-temperature exhaust gas. For this reason, the flammable exhaust gas is combusted in the exhaust gas combustion region B1 at an upper portion of the carbonization furnace 20 to combust and crack a tar component, and the exhaust gas is discharged from the gas discharge portion 24 as the higher temperature exhaust gas HEG.

The discharged high-temperature exhaust gas HEG is delivered to the gasification furnace 50 via a pipe 17a, and is used as a heat source of the reactor. Since the high-temperature exhaust gas HEG is at a high temperature of higher than 1,000° C., the pipe 17a that supplies the exhaust gas HEG has a heat-resistant structure. A negative pressure is applied to the pipe 17a, and the high-temperature exhaust gas HEG is sent from the carbonization furnace 20 to the gasification furnace 50. The configuration may be such that one or more valves (not illustrated) are provided in the vicinity of the gas discharge portion 24 or at other locations on the pipe 17a, and the driving of the valves is controlled to control the flow of the exhaust gas.

Figure 4:
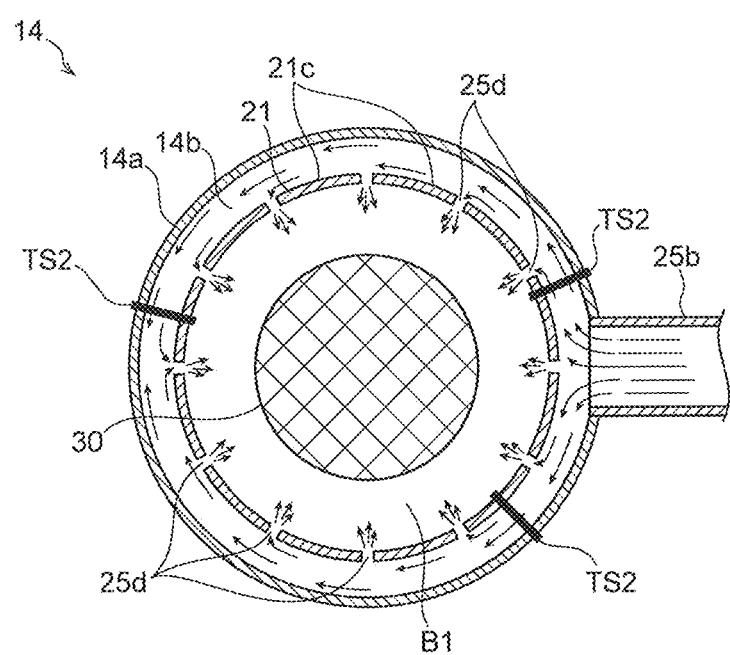
FIG. 4 is a horizontal sectional view schematically illustrating a cross section of a second air supply mechanism seen in a direction of line F-F attached to the carbonization furnace portion in FIG. 1.

In the carbonization furnace 20 illustrated in FIG. 1, in order to control the combustion of the flammable exhaust gas, a second air supply mechanism 14 having the same structure as that of the first air supply mechanism 13 is provided in a region outside the exhaust gas combustion region B1. FIG. 4 illustrates a cross-sectional view taken along a direction of line F-F in FIG. 1. In this drawing, the protrusion portion 32 having a screw shape of the heat storage body 30 and the shape of the bottom portion inside the carbonization furnace are also omitted. As can be seen from FIG. 4, the second air supply mechanism 14 has substantially the same configuration as the structure of the first air supply mechanism 13 except that there is no mechanism that supplies steam. Namely, in the second air supply mechanism 14, a second outer peripheral wall 14a surrounds an outer periphery of an outer frame body 21c that is a portion corresponding to the position of the exhaust gas combustion region B1, and a heating space 14b is formed. Combustion air is supplied to the heating space 14b from an air supply port 25b. The second frame body portion 21c surrounded by the second outer peripheral wall 14a has one or a plurality of through-holes 25d penetrating therethrough to the exhaust gas combustion region B1 inside the carbonization furnace.

Incidentally, Patent Document 1 also discloses a configuration where combustion air is input to combust the exhaust gas in an upper portion of the carbonization furnace and to thermally crack a tar component. However, in the technique of Patent Document 1 and the invention, the combustion of the exhaust gas is controlled in a completely opposite manner. First, in Patent Document 1, when the temperature of the exhaust gas combustion region (temperature of the exhaust gas) decreases to a certain temperature or lower, the input of the combustion air is stopped to prevent a decrease in the temperature of the exhaust gas combustion region caused by low-temperature combustion air. Namely, the combustion of the flammable gas is temporarily stopped and on standby until the temperature rises. Therefore, during a period where the supply of the combustion air is stopped and the combustion is stopped, a tar component in the exhaust gas cannot be completely combusted, and the exhaust gas is discharged with the tar component remaining therein.

On the other hand, in the carbonization furnace of the invention illustrated in FIG. 1, when the temperature of the exhaust gas combustion region B1 decreases to a certain temperature or lower (first temperature or lower), contrary to Patent Document 1, control is performed such that the input amount of the combustion air is increased to promote combustion, thereby raising the temperature. Namely, in the invention, even when the temperature of the exhaust gas combustion region B1 decreases, control is performed such that the combustion air heated by the second air supply mechanism 14 is supplied to promote the combustion of the flammable gas, and the temperature is raised by the combustion. Therefore, the exhaust gas is discharged without a tar component of the flammable exhaust gas remaining therein. As described above, in the invention, even when the combustion air is supplied to cause the temperature of the exhaust gas combustion region B1 to temporarily decrease, control is performed such that the combustion air is continuously supplied to promote combustion, thereby raising the temperature of the exhaust gas or the like.

In an embodiment of the second air supply mechanism 14 of the invention illustrated as an example in FIGS. 1 and 2, since the supplied combustion air is heated to high temperature by the outer frame body 21, and then is supplied to the exhaust gas combustion region B1 via the plurality of through-holes 25c, even when the combustion air is supplied to the exhaust gas combustion region B1, the temperature of the exhaust gas is unlikely to decrease.

Incidentally, in the carbonization furnace illustrated in FIGS. 1 to 4, the first and second air supply portions 25a and 25b are connected to the first and second air supply mechanisms 13 and 14, and the combustion air is sent into the heating spaces 13b and 14b. However, the configuration may be such that instead of providing the heating spaces 13b and 14b, one or a plurality of the first and second air supply portions 25a and 25b are directly connected to portions of the outer frame body 21 corresponding to the positions of the organic material combustion region A1 and the exhaust gas combustion region B1, and the combustion air is sent into the organic material combustion region A1 and into the exhaust gas combustion region B1. In that case, the configuration may be such that the pipe 17a for the exhaust gas HEG is provided with the same heat exchanger as a heater 43 used for the gasification furnace 50 to be described later, and after the temperature of the combustion air is raised to high temperature by the heat exchanger, the combustion air is supplied to the exhaust gas combustion region B1.

In addition, it is desirable that the combustion air is heated to supply high-temperature combustion air, but the configuration may be such that the combustion air is directly supplied to the combustion regions A1 and B1 without the combustion air being heated in advance.

<Operation of Carbonization Furnace>

As described above, in this specification, an example is provided in which a carbide is generated by using woody biomass as a raw material, and the woody biomass C1 serving as a raw material is contained and dried in the drying chamber 11. From the viewpoints of improving the drying efficiency, improving the carbonization efficiency, stably controlling the degree of carbonization or the carbonization speed in the carbonization furnace 20, and the like, it is preferable that the biomass C1 to be input to the carbonization furnace 20 is supplied to the drying chamber 11 in the state of wood chips C1 cut to a relatively small size, for example, 10 cm or less, preferably 5 cm or less by a cutting device or the like.

The biomass C1 such as wood chips is dried in the drying chamber 11 before being input to the carbonization furnace 20. The biomass C1 is dried to a moisture content of preferably 40% or less. In the carbonization furnace of the related art, wood chips need to be dried to a moisture content of approximately 10%, but as described above, in the carbonization furnace of the invention, since high-temperature steam is radiated, the organic material C1 having a dryness level equivalent to a moisture content of approximately 40% can also be input.

As drying means, the organic material can be efficiently dried, for example, by using the high-temperature exhaust gas HEG as a heat source of the gasification furnace and the like, and then sending the exhaust gas HEG into the drying chamber 11. The dried biomass C1 is input to the carbonization furnace 20 using the input device 12.

At the start of operation of the carbonization furnace 20, first, a predetermined amount of the organic material C1 is input, and the organic material C1 in the organic material combustion region A1 is ignited. Until the temperature of the organic material combustion region A1 and the temperature of the heat storage body 30 reach approximately 800° C., in order to completely combust the organic material C1 and raise the temperature of the organic material combustion region A1, a large amount of air and the organic material C1 of an amount suitable for complete combustion are sequentially supplied. When the temperature of the organic material combustion region A1 of the carbonization furnace and the temperature of the heat storage body 30 reach a desired temperature (preferably around 800° C.) and are stabilized, the supply amount of the air is controlled such that a part of the organic material C1 is partially combusted and the temperature of the organic material combustion region A1 of the carbonization furnace is stably maintained at the desired temperature. At the same time, steam is supplied to the heating space 13b of the first air supply mechanism 13. Accordingly, a part of the organic material C1 in the organic material combustion region A1 is partially combusted, and the remaining organic material C1 that is not combusted in the organic material combustion region A1, and the carbide are conveyed to the carbonization region A2 and are carbonized therein.

The organic material C1 dropped from the organic material inlet 22 of the carbonization furnace falls and is accumulated on the upper portion of the heat storage body 30 and on the protrusion portion 32 of the heat storage body 30. The organic material C1 accumulated on the protrusion portion 32 having a screw shape is conveyed to a lower side of the carbonization furnace 20 through a space between the outer peripheral portion 31 of the heat storage body 30 and the inner wall 21a of the outer frame body 21 by the rotation of the heat storage body 30. Namely, when the heat storage body 30 is rotated, the organic material C1 can be gradually moved from the organic material combustion region A1 to the carbonization region A2 therebelow by the protrusion portion 32 having a screw shape, and when the rotational speed of the heat storage body 30 is controlled, the stay time of the organic material C1 in the organic material combustion region A1 and in the carbonization region A2 can be controlled according to the rotational speed of the heat storage body 30.

In the carbonization furnace of the related art which is provided with a heat storage body without a protrusion portion, since a combustion and carbonization process is controlled by controlling the temperature of the organic material combustion region A1 and the input amount of the organic material C1 according to a combustion state of the organic material C1 accumulated inside the carbonization furnace and to a state of movement of the organic material C1 by natural fall involving the extraction of the carbide, the stay time of the organic material C1 cannot be accurately controlled, and unstable control is compelled. On the other hand, in the invention, with the above-mentioned configuration, the moving speed of the organic material C1 inside the carbonization furnace in the vertical direction (height direction) can be accurately controlled. Accordingly, it is possible to adjust both the stay time and the amount of air in the organic material combustion region A1, and it is possible to accurately control the temperature of the carbonization furnace or the carbonization speed, the carbonization quality, and the like of the organic material C1.

In such a manner, the carbide C2, combustion ash, and the like that are carbonized are extracted from the carbide extraction portion 23 provided on a lower side of the carbonization region A2 of the carbonization furnace 20. The carbide C2 extracted from the carbide extraction portion 23 is conveyed to the gasification furnace 50 via a conveyance path 15a.

Incidentally, when the amount of the organic material C1 in the organic material combustion region A1 is reduced by combustion or by the extraction of the carbide C2 from the carbide extraction portion 23, the dried organic material C1 is sequentially input and replenished from the organic material inlet 22. Regarding the input amount of the dried organic material C1, the input amount can be controlled by the input device 12, and automatic control, or manual control based on visual information can be performed according to an operation status.

In addition, as described above, the flammable gas generated by combustion or the like is combusted in the exhaust gas combustion region B1, and is discharged from the gas discharge portion 24 as the high temperature (high temperature of preferably higher than 1,000° C.) exhaust gas HEG.

In the invention, a second temperature sensor TS2 is provided close to the through-holes 25c, and when the detected temperature of the second temperature sensor TS2 decreases to a desired certain temperature or lower, the amount of air to be supplied from the second air supply portion 25b is increased, and the amount of air to be input to the exhaust gas combustion region B1 from the through-holes 25c is increased. Accordingly, control is performed such that the combustion of flammable exhaust gas in the exhaust gas combustion region B1 is promoted to combust a tar component and to raise the temperature of the exhaust gas to be discharged from the carbonization furnace. Accordingly, the tar component contained in the flammable gas is completely thermally cracked at high temperature in the exhaust gas combustion region B1, and is discharged as the high-temperature exhaust gas HEG which does not contain the tar. It is preferable that the exhaust gas HEG is at a high temperature of 1,000° C. or higher. The high-temperature exhaust gas HEG discharged from the gas discharge portion 24 is delivered to the gasification furnace 50 via the pipe 17a. Since the high-temperature exhaust gas HEG is at a high temperature of higher than 1,000° C., the pipe 17a that supplies the exhaust gas HEG has a heat-resistant structure.

The carbide C2 extracted from the carbide extraction portion 23 of the carbonization furnace 20 is sent to the gasification furnace 50 via the conveyance path 15a. Incidentally, in FIG. 1, one each of the first and second air supply portions 25a and 25b and one each of the first and second temperature sensors TS1 and TS2 are illustrated as being provided in the first and second air supply mechanisms 13 and 14, but as illustrated in FIG. 2, a plurality of the first and second air supply portions 25a and 25b and a plurality of the first and second temperature sensors TS1 and TS2 may be provided.

<Gasification Furnace>

Returning to FIG. 1, the gasification furnace 50 will be described. The carbide C2 extracted from the carbonization furnace 20 is input to the gasification furnace 50, together with a gasifying agent, to generate hydrogen and other gases (hereinafter, referred to as a generated gas).

FIG. 1 illustrates an example where the gasification furnace 50 includes two gasification units 51a and 51b each having a tubular shape. When one gasification unit is provided, the single gasification unit serves as the gasification furnace as it is. The number of the gasification units forming the gasification furnace may be 1, 2, or 3 or more. The gasification units 51a and 51b include tubular main body portions 52a and 52b including internal spaces 55a and 55b each having a tubular shape, and include heating units 56a and 56b that penetrate through the insides of the internal spaces 55a and 55b each having a tubular shape, in a length direction. The internal spaces 55a and 55b surrounding the heating units 56a and 56b of the gasification units 51a and 51b serve as reactors or reaction units (hereinafter, appropriately referred to as the "internal spaces 55a and 55b" or "reaction units 55a and 55b").

The heating units 56a and 56b include flow paths 57a and 57b inside, gas being able to pass through the flow paths 57a and 57b, and the high-temperature exhaust gas HEG flows through the flow paths 57a and 57b to heat the reaction units 55a and 55b by means of radiant heat or contact heat. In the example illustrated in FIG. 1, the high-temperature exhaust gas HEG that is sent via the pipe 17a is supplied to the flow paths 57a and 57b of the heating units 56a and 56b, but high-temperature gas to be supplied to the heating units 56a and 56b is not limited to the high-temperature exhaust gas HEG, and high-temperature gas generated by other methods or steam can also be used.

Since the heating units 56a and 56b penetrate through the insides of the tubular main body portions 52a and 52b of the gasification units 51a and 51b, the heating units 56a and 56b are surrounded by the reaction units 55a and 55b each having a tubular shape. The gasification units 51a and 51b include a raw material supply unit 40 on an upstream side (upper side in FIG. 1), the raw material supply unit 40 inputting the carbide as a raw material and a gasifying agent. In the example illustrated in FIG. 1, the raw material supply unit 40 includes a carbide supply unit 41, a pulverizing unit 42, and a spray input unit. The carbide supply unit 41 contains the carbide C2, and supplies a proper amount of the carbide C2 required for gasification reaction to the pulverizing unit 42, based on control of a control unit (refer to FIG. 6).

When the carbide C2 is supplied from the carbide supply unit 41, in order to promote the gasification reaction, the pulverizing unit 42 pulverizes and micronizes the carbide C2 to 300 μm or less, preferably 100 μm or less, and more preferably 50 μm. A carbide C3 pulverized and micronized by the pulverizing unit 42 is input to the reaction units 55a and 55b by being sprayed from spray input units 53a and 53b of the gasification units 51a and 51b, respectively, together with high-temperature steams Hva and Hvb used as gasifying agents.

It is preferable that the high-temperature steams Hva and Hvb used as gasifying agents are heated to high temperature and are mixed with the micronized carbide C3 in a superheated steam state so as to cause the temperature of the reactor not to decrease as much as possible. The steams Hva and Hvb can be transformed into the high-temperature superheated steams Hva and Hvb by heating the steam Wv of approximately 160° C. generated by the boiler 45 to be described later, with the heater 43 provided in the middle of the pipe 17a for the high-temperature exhaust gas HEG. The high-temperature superheated steams Hva and Hvb are input to the reaction units 55a and 55b of the gasification units 51a and 51b as gasifying agents, respectively, together with the carbide C3. In order to prevent a decrease in the temperature of each reaction unit, it is preferable that the temperatures of the high-temperature superheated steams Hva and Hvb are raised close to as high temperature as possible, for example, a high temperature in a range of 900° C. to 1,300° C.

The micronized carbide C3 and the superheated steams Hva and Hvb that are gasifying agents are input to the reaction units 55a and 55b by being sprayed from the spray input units 53a and 53b, respectively. At this time, it is preferable that the carbide C3 and the gasifying agents of high temperature are input by being sprayed from the spray input units 53a and 53b such that the carbide C3 and the gasifying agents of high temperature slowly move inside the reactors in a downstream direction while rotating around the heating units 56a and 56b inside the reaction units 55a and 55b.

Incidentally, FIG. 1 illustrates an example where one spray input unit 53a and one spray input unit 53b are provided for the gasification units 51a and 51b, respectively, but the configuration may be such that the gasification units are provided with a plurality of the spray input units 53a and 53b, respectively. Accordingly, since the raw material can be input to each of the reaction units 55a and 55b from a plurality of positions, the carbide C3 and the gasifying agents can be sprayed to the heating units at a large number of angles, and heat of the heating units can be more uniformly used for gasification reaction, so that efficient gasification reaction can be achieved.

Incidentally, in the example of FIG. 1, since biomass is described as an example of a raw material, the above-described configuration example is provided as the raw material supply unit 40, but in the case of an organic material such as waste plastic, the configuration also can be such that the plastic is gasified at high temperature, and the gasified high-temperature plastic is input to the reaction units 55a and 55b by being sprayed from the raw material supply unit 40. The high-temperature exhaust gas HEG from the carbonization furnace can be used as heat energy for gasifying the plastic or the like.

When two or more gasification units 51a and 51b are provided, a joining portion 58 is provided at a position on a side opposite the raw material supply unit 40 (lower side in the FIG. 1), which is a downstream side of the gasification units, and the reaction units 55a and 55b of the gasification units 51a and 51b are connected to each other by the joining portion 58. The joining portion 58 is provided with a generated gas extraction pipe 60 extending upward, and the generated gas is extracted from a gas extraction port 61 provided at an upper portion of the generated gas extraction pipe 60. A discharge port that discharges a residue D is provided on a lower side of the joining portion 58.

When the generated gas extraction pipe 60 is provided, a residue such as heavy ash cannot rise through the generated gas extraction pipe 60 and falls downward, so that the generated gas GS excluding ash or the like can be extracted from an upper side. Even when only one gasification unit is provided, similarly to FIG. 1, it is preferable that the configuration is such that the generated gas extraction pipe 60 is provided to extend upward from a downstream side of the reaction unit of the one gasification unit and the gas extraction port 61 is provided at an upper portion of the generated gas extraction pipe 60 to extract the generated gas from an upper side of the generated gas extraction pipe 60. However, such a generated gas extraction pipe is not indispensable, and the configuration may be such that instead of providing the generated gas extraction pipe 60, the generated gas is extracted from the joining portion 58 downstream of the reaction units 55a and 55b.

A negative pressure is applied to the generated gas extraction pipe 60 from the gas extraction port 61, and the generated gas GS is suctioned and moved from the insides of the reaction units 55a and 55b to the gas extraction port 61 via the generated gas extraction pipe 60. Since impurities or ash is heavy, the impurities or the ash falls to lower sides of the reactors and the joining portion 58, and is discharged from the lower side of the joining portion 58 as the residue D. The generated gas GS is extracted from the gas extraction port 61, and is stored in the gas tank 65 via various filters, a cooling device, and the like.

The high-temperature exhaust gas HEG extracted from the carbonization furnace 20 is supplied, as a heat source, to the heating units 56a and 56b of the gasification units 51a and 51b of the gasification furnace 50 via the pipe 17a having heat resistance. Since the heating units 56a and 56b penetrate through the reaction units 55a and 55b, radiant heat from the heating units 56a and 56b is radiated to the reaction units 55a and 55b in all directions.

FIG. 1 illustrates an example where each of the heating units 56a and 56b of the gasification furnace 50 is configured as one pipe, but each of the heating units 56a and 56b can also be configured as a plurality of pipes penetrating through each of the reaction units 55a and 55b. Accordingly, heat energy of the high-temperature exhaust gas HEG can be more efficiently transferred to the raw materials (micronized carbide C3 and the superheated steams) of the reaction units 55a and 55b. In addition, FIG. 1 illustrates a configuration where the two gasification units 51a and 51b include one set of the carbide supply unit 41 and the pulverizing unit 42, but one set (a total of two sets in FIG. 1, and three sets when three gasification units are provided) may be provided for each of the gasification units 51a and 51b.

The exhaust gas HEG that has passed through the heating units 56a and 56b of the gasification furnace 50 is then sent to the boiler 45, and is used as a heat source of the boiler to generate the saturated steam Wv of approximately 160° C. The saturated steam Wv generated by the boiler 45 is also sent to steam supply pipes 36c and 36f or to a steam chamber 35 in a carbonization furnace according to second to fourth embodiments illustrated in FIGS. 3 to 5. When the saturated steam Wv passes through the exhaust gas combustion region B1 of the carbonization furnace via the first air supply mechanism 13 or via the steam chamber 35 and the steam supply pipes 36c to 36f, the saturated steam Wv is additionally heated to high temperature to become high-temperature superheated steam, and the high-temperature superheated steam is sprayed to the biomass (organic material) C1 in the organic material combustion region A1.

<Operation of Gasification Furnace>

The carbide C2 extracted from the carbide extraction portion 23 of the carbonization furnace 20 is sent to the carbide supply unit 41 via the conveyance path 15a. The carbide of an amount required for gasification which is contained in the carbide supply unit 41 is appropriately supplied to the pulverizing unit 42, and is transformed into the micronized carbide C3. The micronized carbide C3 and the high-temperature superheated steams Hva and Hvb that are gasifying agents are sprayed by the spray input units 53a and 53b to be input to the reaction units 55a and 55b of the gasification units 51a and 51b, respectively.

Since the high-temperature exhaust gas HEG of 1,000° C. to 1,300° C. flows through the flow paths 57a and 57b of the heating units 56a and 56b, and the heating units 56a and 56b penetrate through the reaction units 55a and 55b, a large amount of heat energy is supplied to the reactors by radiant heat or contact of the heating units 56a and 56b. Accordingly, the heat energy of the exhaust gas HEG can be efficiently taken into the reactors.

In the biomass power generation system, normally, hydrogen gas and carbon monoxide gas are mainly generated and provided as fuel. For this reason, an example is provided in which high-temperature steam is used as a gasifying agent, but the gasifying agent to be used can be appropriately selected according to the type of gas to be generated.

As described above, it is desirable that each of the spray input units 53a and 53b of the gasification units 51a and 51b is provided with a spray nozzle, and the micronized carbide C3 and the high-temperature steams Hva and Hvb are input to each of the reaction units 55a and 55b in a mixed atmosphere by spraying, so as to wrap around the heating units 56a and 56b and move to the downstream side in the reaction pipes as slow as possible.

The generated gas GS that is generated from the carbide C3 by gasification reaction in the gasification furnace 50 passes through a gas recovery path 15b to become cooled and free from impurities through a plurality of filters and a cooling device (both not illustrated), and is stored in the gas tank 65. A heat recovery device or a cooling device that decreases the temperature of the generated gas, and a filter, all of which are known, can be used.

The generated gas (water gas and the like) GS stored in the gas tank 65 can be supplied to an ethanol generation device to generate ethanol, used to extract hydrogen gas, or used as energy to generate electricity in a fuel cell, in addition to being used as energy for driving, for example, the generator 67.

Heat energy of the high-temperature exhaust gas HEG that has passed through the flow paths 57a and 57b of the heating units 56a and 56b of the gasification furnace 50 is recovered by the boiler 45 or a heat exchanger (not illustrated), so that the high-temperature exhaust gas HEG becomes exhaust gas LEG of a relatively low temperature. A part of the exhaust gas LEG is sent to the drying chamber 11 via a pipe 18, and is used to dry the biomass. The remaining exhaust gas LEG passes through a plurality of filters, a cooling device 46, and the like, is processed such that the temperature and the amount of impurities satisfy a predetermined discharge standard, and then is released to the outside.

<Second Embodiment of Carbonization Furnace>

Figure 5:
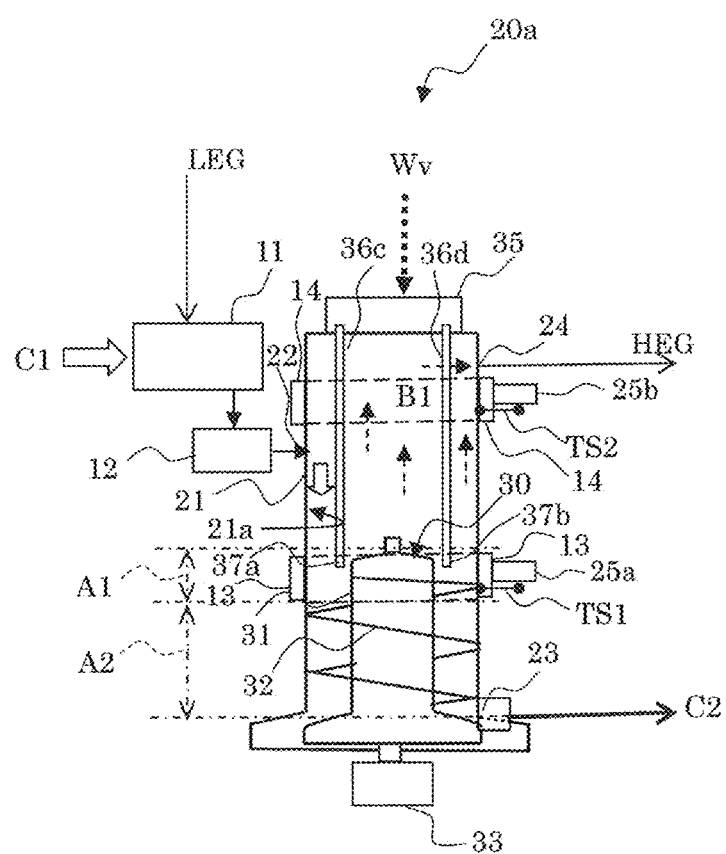
FIG. 5 is a partial vertical sectional view schematically illustrating another embodiment in which high-temperature steam is input to the organic material combustion region.

FIG. 5 illustrates a second embodiment of a carbonization furnace of the invention. A carbonization furnace 20a according to the second embodiment is different from the carbonization furnace illustrated in FIGS. 1 to 4 in that the carbonization furnace 20a has a structure where the steam supply pipes 36c and 36d extending downward from an upper portion of the carbonization furnace 20a radiate superheated steam to the biomass C1 in the combustion region A1. In the carbonization furnace 20a according to the second embodiment, high-temperature superheated steam is generated in the steam chamber 35 provided above the exhaust gas combustion region B1. Since the exhaust gas combustion region B1 is a heat source for the high-temperature exhaust gas HEG, superheated steam of a higher temperature than in the embodiment of FIGS. 1 to 4 can be generated. In addition, when the superheated steam is conveyed to the organic material combustion region A1 via the steam supply pipes 36c and 36d, the superheated steam is additionally heated to become the superheated steam of close to approximately 1,000° C., and the superheated steam of close to approximately 1,000° C. is radiated to the organic material C1 in the organic material combustion region A1.

Incidentally, regarding the steam chamber 35, as described above, from the viewpoint of suppressing a decrease in the temperature of the exhaust gas combustion region B1 of the carbonization furnace 20a, it is preferable that the saturated steam Wv of a temperature of around 160° C. is supplied to the steam chamber 35 from the boiler 45 (FIG. 1), and the saturated steam Wv is additionally heated in the steam chamber 35 to generate superheated steam. However, water can be directly supplied to the steam chamber 35 to generate steam. Incidentally, it is preferable that a bottom surface of the steam chamber 35 is made of a material having a high thermal conductivity. The high-temperature superheated steam can be radiated to the organic material C1 in the organic material combustion region A1. Since the organic material C1 is directly irradiated with the high-temperature superheated steam of around 1,000° C., it is possible to obtain the high-temperature carbonization promotion effect, and it is possible to increase the carbonization efficiency.

<Third Embodiment of Carbonization Furnace>

Figure 6:
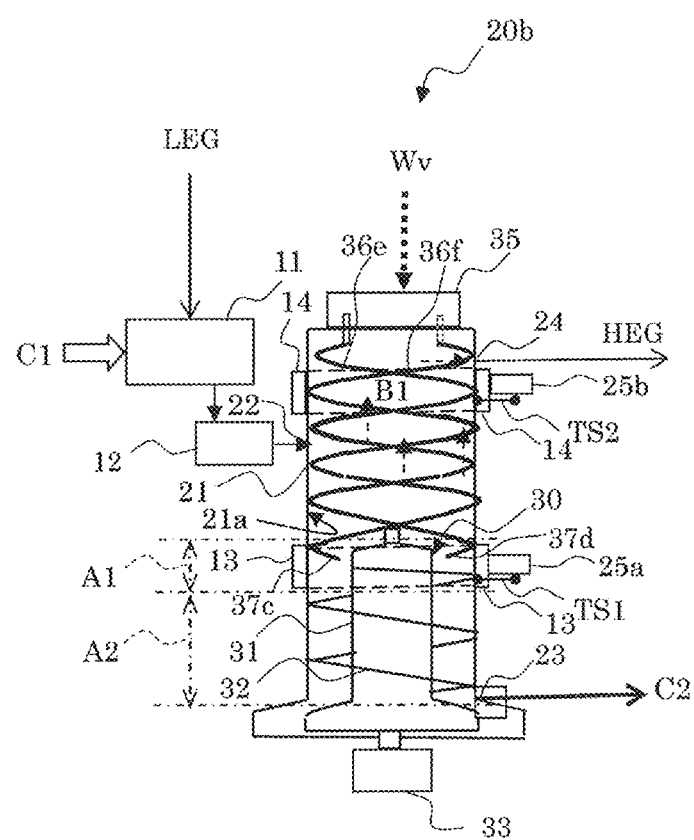
FIG. 6 is a partial vertical sectional view schematically illustrating still another embodiment in which superheated steam is input to the organic material combustion region.

FIG. 6 illustrates a third embodiment of a carbonization furnace. A carbonization furnace 20b according to the third embodiment of the invention illustrated in FIG. 6 is different from the carbonization furnace 20a according to the second embodiment illustrated in FIG. 5 in that in the carbonization furnace 20b according to the third embodiment, the steam supply pipes 36e and 36f that supply high-temperature superheated steam from the steam chamber 35 to the organic material combustion region A1 are spirally routed along the inner wall 21a of the carbonization furnace. Since a distance where the high-temperature superheated steam passes through the exhaust gas combustion region B1 is configured to be lengthened in such a manner, the heating efficiency of the steam passing through the steam supply pipes is increased, and higher temperature superheated steam can be generated. With this configuration, it is possible to shorten the heating time in the steam chamber 35, and it is possible to additional heat the superheated steam released to the organic material combustion region A1, to high temperature, so that it is possible to further increase the high-temperature carbonization promotion effect.

Figure 7:
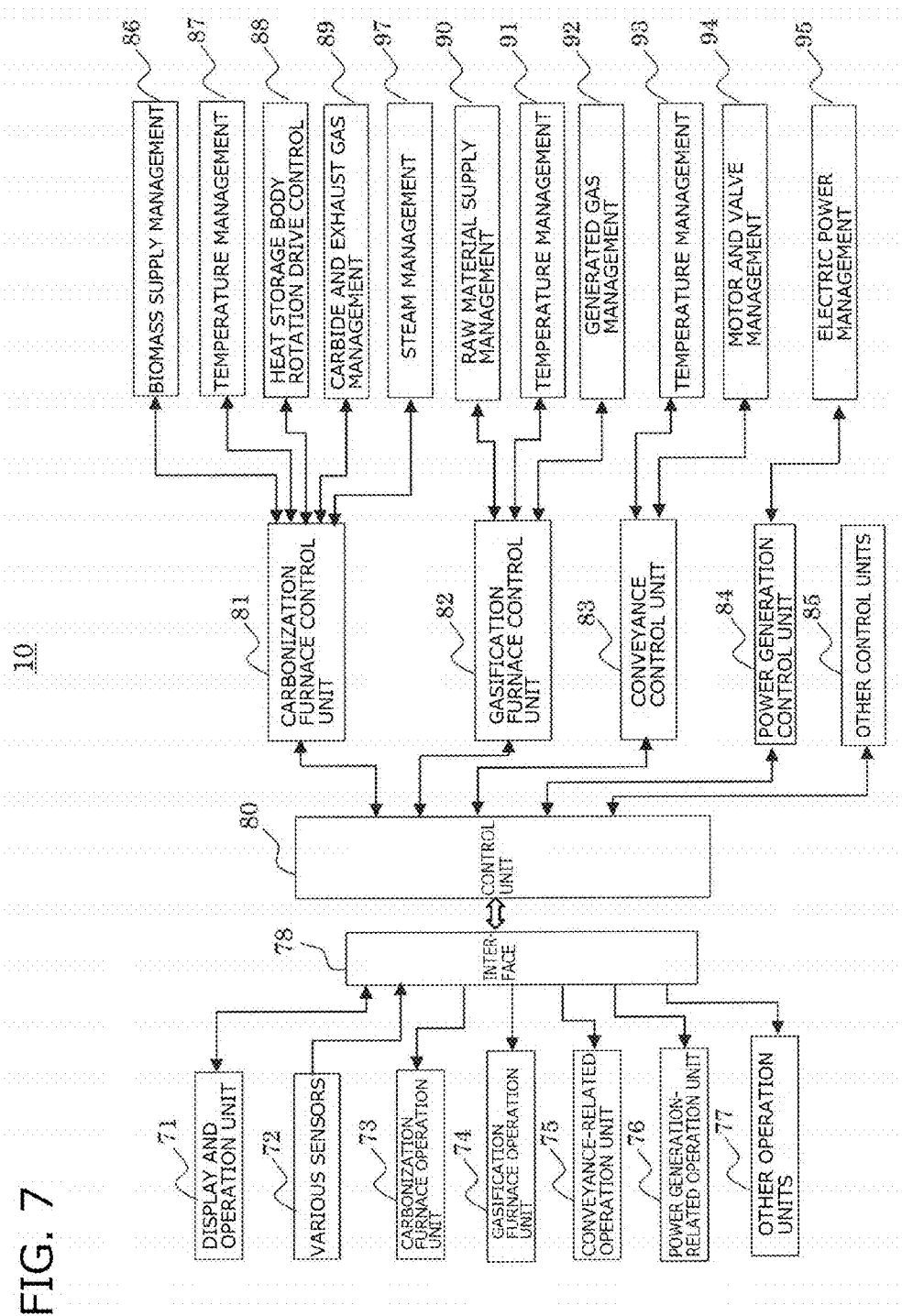
FIG. 7 is a functional block diagram illustrating one example of control of the organic material gasification system (example of use in a biomass power generation system) according to the invention.

FIG. 7 is a functional block diagram illustrating one example of a basic configuration of a control system of the carbonization furnaces 20, 20a, and 20b, the gasification furnace 50, and the organic material gasification system 10 (biomass power generation system) illustrated in FIGS. 1 to 6. The outline of control of each part will be simply described with reference to FIG. 6. Parts designated by reference numerals 71 to 77 indicate passive devices such as sensors and an active device group such as valves, which are provided in the carbonization furnace, the gasification furnace, or the like illustrated in FIGS. 1 to 5. For example, a plurality of temperature sensors and pressure sensors that are provided correspond to passive devices, and valves, various motors, operation units, a conveyance path, and the like correspond to active devices. A control unit 80 acquires various information or control data from the sensors, the operation units, or the like of the devices and operation unit groups 71 to 77, and controls operation of the carbonization furnace, the gasification furnace, the conveyance path, and the like.

In FIG. 7, a display and operation unit 71, various sensors 72, a carbonization furnace operation unit 73, a gasification furnace operation unit 74, a conveyance-related operation unit 75, a power generation-related operation unit 76, other operation units 77, and the like are provided as examples of devices from which control information is acquired and of devices to be controlled.

The display and operation unit 71 includes a display unit that monitors an operating status of the carbonization furnace, an operating status of the gasification furnace, and states of the gas tank, the generator, and the like, an operation unit to be manually operated, and the like. The various sensors 72 include, for example, temperature sensors, pressure sensors, and the like, and the carbonization furnace operation unit 73 includes an organic material input unit, a motor that drives and rotates the heat storage body, blowers that supply first and second airs, a carbide extraction portion that extracts a carbide, and the like. The gasification furnace operation unit 74 includes nozzles that spray a micronized carbide, a gasifying agent, or the like, and the conveyance-related operation unit 75 includes a screw conveyor that conveys biomass, a carbide, a residue, or the like. The power generation-related operation unit 76 includes an engine, the generator, an electric power control device, and the like, and the other operation units 77 include valves that adjust the passage or pressure of exhaust gas, generated gas, air, steam, or the like, the boiler, and the like.

The control unit 80 includes a CPU, a memory, a recording medium, basic control software, and the like, and an existing server or computer can be used. A carbonization furnace control unit 81, a gasification furnace control unit 82, a conveyance control unit 83, a power generation control unit 84, and other control units 85 are provided which are control software for modules that control the carbonization furnace, the gasification furnace, the generator, the conveyance path, and the like which are basic components of the biomass power generation system, and each drive unit of a module in charge is controlled based on information acquired from the various sensors or an instruction from the operation unit.

Instruction data from the display and operation unit 71 and data from the various sensors 72 are transmitted to the control unit 80 via an interface 78 as control data. The control unit 80 hands over the acquired data to each of the corresponding control units 81 to 85, and the control units 81 to 85 each determine whether or not the control of the operation units is required, based on the received control data. When a control operation is required, a control signal is transmitted to the corresponding display and operation unit 71 and to the corresponding operation units 73 to 77 via the control unit 80 and via the interface 78, and operation of each part is controlled. In the corresponding display and operation unit 71 and the corresponding operation units 73 to 77, a predetermined operation is carried out based on the received control signal.

The software modules or individual operation programs illustrated in FIG. 7 are provided as an example, and the invention is not limited to the software and the programs illustrated here as an example. The carbonization furnace control unit 81 is a control program to control each part of the carbonization furnace, and controls operation of the carbonization furnace, for example, based on individual operation programs such as a biomass supply management 86, a temperature management 87, a heat storage body rotation drive control 88, and a carbide and exhaust gas management 89. The gasification furnace control unit 82 is a control program to control each part of the gasification furnace, and controls operation of the gasification furnace, based on individual programs such as a raw material supply management 90, a temperature management 91, and a generated gas management 92. In addition, as illustrated as a block 97 in FIG. 7, a program 97 to control the supply of high-temperature steam (preferably superheated steam) is also provided to control the supply of the high-temperature steam such that carbonization in the organic material combustion region A1 can be promoted with high efficiency.

The conveyance control unit 83 controls the supply, the movement, the extraction, and the like of a raw material, products, and waste in the biomass power generation system. For example, operation of each conveyance motor or valve is controlled based on a program such as a motor and valve management 94, and the temperature management or the like of a carbide, exhaust gas, a gasifying agent (high-temperature steam or the like), generated gas, the movement of waste, various steams, and the like is performed based on a program such as a temperature management 93. The power generation control unit 84 performs the management and the control of supply of gas to generate electricity or of an output electric power based on a program of an electric power management 95, and the other control units 85 perform a warning of an abnormal state and other necessary management or control.

In all the carbonization furnace 20, the gasification furnace 50, and the generator 67, control at the start of operation and control in a stable operating state are significantly different from each other. At the start of operation, the organic material C1 dried in the drying furnace is input to the carbonization furnace 20, and the organic material C1 is combusted in the organic material combustion region A1 until the temperature of the first temperature sensor TS1 reaches a predetermined temperature. When the organic material C1 is input, the temperature rises to reach the predetermined temperature, the temperature is stabilized, and operation can be normally performed, the carbide, the combustion residue, or the like at the time of an initial operation is extracted from the carbide extraction portion 23, and a transition is made to control of a normal operation.

In the normal operation, first, according to the generation amount of the carbide which is set by the operation unit or the like based on an operation target, various basic data regarding the input amount of the organic material C1 per unit time, the rotational speed of the heat storage body, the supply amount of combustion air to be supplied from the first and second air supply mechanisms 13 and 14, and the input amount of high-temperature steam to be supplied from the first air supply mechanism 13 is set. Based on the basic data, the organic material C1 that is a raw material is input, the heat storage body is rotated at a predetermined rotational speed, a predetermined amount of the combustion air is supplied to the organic material combustion region A1 and to the exhaust gas combustion region B1, a predetermined amount of steam at a predetermined temperature is supplied to the organic material combustion region A1, and the normal operation is started.

In the normal operation, the carbonization furnace control unit 81 and the carbonization furnace control unit adjusts the amount of the combustion air to be supplied from the first air supply mechanism 13 and the amount of the steam based on information from the first temperature sensor TS1, to control the temperature and the carbonization environment of the organic material combustion region A1 and to control the amount of the organic material C1 to be input and the rotational speed of the heat storage body 30, so that the carbonization furnace 20, 20*a*, or 20*b* can generate the carbide at a set speed. In addition, the amount of combustion air to be sent from the second air supply mechanism 14 is adjusted such that the temperature of the exhaust gas HEG becomes a predetermined temperature or more, to control the combustion of flammable gas and to control the temperature of the exhaust gas HEG.

FIG. 8 illustrates a flowchart illustrating one example of a procedure of controlling the temperature of exhaust gas in the invention. The control unit 80 and the carbonization furnace control unit 81 periodically acquire information from the second temperature sensor TS2 provided in the exhaust gas combustion region B1, and monitors the temperature of exhaust gas (step S1). Next, it is checked whether or not the detected temperature of the second temperature sensor TS2 is a first exhaust gas temperature or lower (step S2). The first exhaust gas temperature can be arbitrarily set to, for example, a temperature of 800° C., 1,000° C., or the like, but is set as a minimum temperature of the high-temperature exhaust gas HEG to be provided to the gasification furnace 50.

When the detected temperature of the second temperature sensor TS2 is lower than the first exhaust gas temperature set in advance (step S2: Yes), the amount of air to be supplied from the second air supply portion is increased (step S3). Accordingly, the combustion of the exhaust gas is promoted, and the temperature of the exhaust gas rises.

When the detected temperature of the second temperature sensor TS2 is higher than the first exhaust gas temperature set in advance (step S2: No), it is checked whether or not the detected temperature of the second temperature sensor TS2 is higher than a second exhaust gas temperature set in advance (step S4). When the detected temperature is lower than the second exhaust gas temperature (step S4: No), temperature check by the second temperature sensor is repeated without particularly changing the amount of air to be supplied. When the detected temperature is higher than the second exhaust gas temperature (step S4: Yes), the supply of air from the second air supply mechanism 14 is reduced (step S5). Accordingly, the combustion of flammable exhaust gas is suppressed, and the temperature of the exhaust gas HEG slightly decreases.

Incidentally, the configuration may be such that the gasification units 51*a* and 51*b* are provided with temperature sensors, and combustion in the exhaust gas combustion region B1 of the carbonization furnace is adjusted based on internal temperatures of the reaction units 55*a* and 55*b* of the gasification units, to control the temperature of the exhaust gas HEG to be discharged from the carbonization furnace. Control of the gasification furnace such as the input amount and the input timing of the micronized carbide C3 and the gasifying agent (superheated steam) to the gasification furnace is performed by the gasification furnace control unit 82, and the provision or the like of the carbide is controlled according to a set production amount of generated gas.

Incidentally, regarding waste plastic or an organic material generated from other industrial products or from a process of manufacturing the same, the organic material is gasified using high heat of the high-temperature exhaust gas HEG to be discharged from the carbonization furnace or the like of the invention, and is input to the gasification unit by spraying. It is desirable that an inlet to the gasification unit is provided separately from the spray input units 53*a* and 53*b* for the micronized carbide C3. Accordingly, the waste plastic or the like can be efficiently gasified.

As obvious from the above description, according to the carbonization furnace of the invention, the movement of the organic material (biomass C1 or the like) inside carbonization furnace is controlled by the protrusion portion provided in the heat storage body inside the carbonization furnace, so that a carbide can be stably produced. In addition, even when the temperature of exhaust gas temporarily decreases, control is performed such that combustion air is supplied to promote the combustion of flammable exhaust gas, so that a tar component of the exhaust gas is combusted at a temperature of 900° C. or higher inside the carbonization furnace to become a gas component that is not recombined, and the gas component can be used as heat energy. Further, since the air for exhaust gas combustion is heated and supplied, the temperature of the exhaust gas to be discharged from the carbonization furnace can be more stably output at high temperature.

Further, since the gas flow paths penetrating through the insides of the gasification units are provided as the heating units, and the reaction units are provided to surround the heating units, gasification reaction can be more efficiently performed by efficiently using heat energy of the high-temperature exhaust gas. Various gasification furnaces that are sized according to the generation amount of biomass can be provided by combining a plurality of such small gasification units having a high gasification efficiency.

An efficient organic material gasification system adapted to regional characteristics can be constructed by such a carbonization furnace that can provide a high carbonization efficiency and accurately control the carbonization speed, and by a small gasification furnace that can be flexibly combined according to a desired output. Accordingly, hydrogen gas and carbon monoxide gas generated from the organic material can be mainly converted into energy fuel such as flammable gas or ethanol, and a biomass power generation system capable of efficiently generating electricity can also be constructed.

In the carbonization furnace of FIGS. 1, 4, and 5, the protrusion portion 32 having a screw shape is provided as an example of a protrusion portion protruding from an outer peripheral surface of the heat storage body 30. However, the shape of the protrusion portion is not limited thereto. In addition, in order to increase heat resistance, the protrusion portion 32 is made of a heat-resistant material, and it is desirable that processing to further improve heat resistance and a heat storage property, such as plasma spraying of ceramics or the like, is performed.

Incidentally, the embodiments disclosed in the specification and in the drawings are provided as examples, and can be appropriately changed in accordance with the concept of the invention. For example, the shape, the size, and the like of the protrusion portion of the heat storage body, and the shapes of and a positional relationship between the heating units and the reaction units of the gasification furnace are not limited to the disclosed embodiments, and can be appropriately changed and carried out in accordance with the technical concept of the invention, and such embodiments are also included within the technical scope of the invention.

What is claimed is:

1. An organic material gasification system comprising:
    a carbonization furnace to generate a carbide when an organic material is input to the carbonization furnace; and
    a gasification furnace including a reactor having a cylindrical shape where the carbide generated by the carbonization furnace and a gasifying agent are input, and a heating unit to heat the reactor, to gasify the input carbide,
    wherein the carbonization furnace includes an organic material combustion region where a part of the organic material is combusted above accumulated organic material to maintain a temperature of the carbonization furnace at a high temperature, a carbonization region provided below the organic material combustion region, where the organic material is carbonized, and a steam supply unit to supply high-temperature superheated steam of a temperature or higher exhibiting a high-temperature carbonization promotion effect, to the organic material in the organic material combustion region, and
    the gasification furnace includes the heating unit having a tubular shape and penetrating through an inside of the reactor having a cylindrical shape in a longitudinal direction, and heats the reactor by causing high-temperature exhaust gas discharged from the carbonization furnace to pass through an inside of the heating unit having a tubular shape;
    wherein the carbonization furnace includes a first air supply mechanism where a heating space in contact with an outer periphery of a first frame body portion is formed by the first frame body portion surrounding an outer side of the organic material combustion region forming a part of an outer frame body of the carbonization furnace, and having at least one through-hole, and by a first outer peripheral wall surrounding the outer periphery of the first frame body portion with a slight gap between the first outer peripheral wall and the first frame body portion, to supply air to the heating space, and to supply combustion air to the organic material combustion region from the through-hole.

2. The organic material gasification system according to claim 1,
    wherein the first frame body portion is made of a material having high heat resistance and a high thermal conductive property, and heats the combustion air input to the heating space to supply high-temperature combustion air to the organic material combustion region via the through-hole, and
    the steam supply unit supplies high-temperature superheated steam to the organic material by inputting steam to the heating space of the first air supply mechanism, by additionally heating the steam, and by inputting the heated high-temperature superheated steam to the organic material combustion region via the through-hole, together with the combustion air.

3. The organic material gasification system according to claim 2,
    wherein the steam supply unit includes a tubular body having a high thermal conductive property and heats steam passing through an inside of the tubular body to input the steam to the organic material as the high-temperature superheated steam.

4. The organic material gasification system according to claim 1,
    wherein the carbonization furnace further includes an exhaust gas combustion region provided above the organic material combustion region, where flammable gas generated in the organic material combustion region is combusted, a second air supply mechanism to supply combustion air to the exhaust gas combustion region, and an exhaust gas discharge portion to discharge high-temperature exhaust gas after the flammable gas is combusted in the exhaust gas combustion region, and
    the gasification furnace heats the reactor by supplying the high-temperature exhaust gas discharged from the exhaust gas discharge portion of the carbonization furnace so as to pass through the inside of the heating unit having a tubular shape.

5. The organic material gasification system according to claim 4, wherein a supply air amount is controlled such that when a temperature of the exhaust gas combustion region is lower than a predetermined first temperature, a supply of the combustion air by the second air supply mechanism is increased, and when the temperature of the exhaust gas combustion region is higher than a predetermined second temperature, a supply of the combustion air by the second air supply mechanism is reduced.

6. The organic material gasification system according to claim 1,
wherein the carbonization furnace further includes an exhaust gas combustion region provided above the organic material combustion region, where flammable gas generated in the organic material combustion region is combusted, a second air supply mechanism to supply combustion air to the exhaust gas combustion region, an exhaust gas discharge portion to discharge high-temperature exhaust gas after the flammable gas is combusted in the exhaust gas combustion region, and the steam supply unit including a steam chamber provided above the exhaust gas combustion region to generate steam, and a steam supply pipe to convey the steam of the steam chamber to the organic material combustion region via the exhaust gas combustion region while heating the steam.

7. The organic material gasification system according to claim 1,
wherein a temperature of the high-temperature superheated steam is 800° C. or higher when the high-temperature superheated steam is input to the organic material.

8. The organic material gasification system according to claim 2,
wherein a temperature of the high-temperature superheated steam is 800° C. or higher when the high-temperature superheated steam is input to the organic material.

9. The organic material gasification system according to claim 1,
wherein the heating unit of the gasification furnace includes a plurality of projections and recesses to increase an area of contact with the reaction unit, in a surface of an outer wall and/or an inner wall of the heating unit.

10. A carbonization furnace used for an organic material gasification system including a carbonization furnace to generate a carbonized carbide when an organic material is input to the carbonization furnace, and a gasification furnace including a reactor having a cylindrical shape where the carbide generated by the carbonization furnace and a gasifying agent are input, and a heating unit to heat the reactor, to gasify the input carbide, the carbonization furnace comprising:
an organic material combustion region where a part of the organic material is combusted above accumulated organic material to maintain a temperature of the carbonization furnace at a high temperature,
a carbonization region provided below the organic material combustion region, where the organic material is carbonized, and
a steam supply unit to supply high-temperature superheated steam of a temperature or higher exhibiting a high-temperature carbonization promotion effect, to the organic material in the organic material combustion region;
wherein the carbonization furnace includes a first air supply mechanism where a heating space in contact with an outer periphery of a first frame body portion is formed by the first frame body portion surrounding an outer side of the organic material combustion region forming a part of an outer frame body of the carbonization furnace, and having at least one through-hole, and by a first outer peripheral wall surrounding the outer periphery of the first frame body portion with a slight gap between the first outer peripheral wall and the first frame body portion, to supply air to the heating space, and to supply combustion air to the organic material combustion region from the through-hole.

11. The carbonization furnace according to claim 10,
wherein the first frame body portion is made of a material having high heat resistance and a high thermal conductive property, and heats the combustion air input to the heating space to supply high-temperature combustion air to the organic material combustion region via the through-hole, and
the steam supply unit supplies high-temperature superheated steam to the organic material by inputting steam to the heating space of the first air supply mechanism, by additionally heating the steam, and by inputting the heated high-temperature superheated steam to the organic material combustion region via the through-hole.

12. The carbonization furnace according to claim 11,
wherein the steam supply unit includes a tubular body having a high thermal conductive property and heats steam passing through an inside of the tubular body to input the steam to the organic material as the high-temperature superheated steam.

13. The carbonization furnace according to claim 10, further comprising:
an exhaust gas combustion region provided above the organic material combustion region, where flammable gas generated in the organic material combustion region is combusted, a second air supply mechanism to supply combustion air to the exhaust gas combustion region, and an exhaust gas discharge portion to discharge high-temperature exhaust gas after the flammable gas is combusted in the exhaust gas combustion region, and to supply the high-temperature exhaust gas to the heating unit of the gasification furnace.

14. The carbonization furnace according to claim 13,
wherein a supply air amount is controlled such that when a temperature of the exhaust gas combustion region is lower than a predetermined first temperature, a supply of the combustion air by the second air supply mechanism is increased, and when the temperature of the exhaust gas combustion region is higher than a predetermined second temperature, a supply of the combustion air by the second air supply mechanism is reduced.

15. The carbonization furnace according to claim 10, further comprising:
an exhaust gas combustion region provided above the organic material combustion region, where flammable gas generated in the organic material combustion region is combusted,
a second air supply mechanism to supply combustion air to the exhaust gas combustion region,
an exhaust gas discharge portion to discharge high-temperature exhaust gas after the flammable gas is combusted in the exhaust gas combustion region, and
the steam supply unit including a steam chamber provided above the exhaust gas combustion region to generate steam, and a steam supply pipe to convey the steam of the steam chamber to the organic material combustion region via the exhaust gas combustion region while heating the steam.

16. The carbonization furnace according to claim 10, wherein a temperature of the high-temperature superheated steam is 800° C. or higher when the high-temperature superheated steam is input to the organic material.

17. The carbonization furnace according to claim 11, wherein a temperature of the high-temperature superheated steam is 800° C. or higher when the high-temperature superheated steam is input to the organic material.

18. A gasification furnace used for an organic material gasification system including a carbonization furnace to maintain a temperature inside the carbonization furnace at a high temperature by combusting a part of the input organic material in an organic material combustion region and to generate a carbonized carbide from an input organic material, and to combust generated flammable gas to discharge high-temperature exhaust gas, and a gasification furnace to input the carbide generated by the carbonization furnace and a gasifying agent to gasify the input carbide, the gasification furnace comprising:

a reactor having a cylindrical shape including an inlet where the carbide and the gasifying agent are input; and a heating unit including a tubular portion penetrating through an inside of the reactor having a cylindrical shape in a longitudinal direction, to heat the reactor by causing high-temperature exhaust gas discharged from the carbonization furnace to pass through an inside of the tubular portion;

wherein the carbonization furnace includes a first air supply mechanism where a heating space in contact with an outer periphery of a first frame body portion is formed by the first frame body portion surrounding an outer side of the organic material combustion region forming a part of an outer frame body of the carbonization furnace, and having at least one through-hole, and by a first outer peripheral wall surrounding the outer periphery of the first frame body portion with a slight gap between the first outer peripheral wall and the first frame body portion, to supply air to the heating space, and to supply combustion air to the organic material combustion region from the through-hole.

19. The gasification furnace according to claim 18, wherein high-temperature superheated steam of 800° C. or higher is input from the inlet as the gasifying agent.

20. The gasification furnace according to claim 18, wherein the heating unit includes a plurality of projections and recesses to increase an area of contact with the reaction unit, in a surface of an outer wall and/or an inner wall of the heating unit.

* * * * *